(12) United States Patent
Thayer

(10) Patent No.: US 6,801,697 B2
(45) Date of Patent: Oct. 5, 2004

(54) REDUCED WEIGHT OBLIQUE VIEW FIBER OPTIC TAPER

(75) Inventor: Paul Anthony Thayer, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 166 days.

(21) Appl. No.: 10/177,777

(22) Filed: Jun. 20, 2002

(65) Prior Publication Data

US 2003/0235380 A1 Dec. 25, 2003

(51) Int. Cl.[7] .................................................. G02B 6/06
(52) U.S. Cl. ...................................... 385/116; 385/121
(58) Field of Search ................................ 385/115, 116, 385/121, 147, 433; 345/84; 65/433

(56) References Cited

U.S. PATENT DOCUMENTS

| | | | |
|---|---|---|---|
| 3,043,910 A | 7/1962 | Hicks, Jr. | |
| 3,187,627 A | 6/1965 | Kapany | |
| 3,680,948 A | 8/1972 | Sussman et al. | |
| 3,874,783 A | 4/1975 | Cole | |
| 4,076,978 A | 2/1978 | Brennan et al. | |
| 4,099,833 A * | 7/1978 | Tosswill | 385/43 |
| 4,647,152 A | 3/1987 | Jeskey | |
| 4,693,552 A * | 9/1987 | Jeskey | 385/116 |
| 4,820,010 A * | 4/1989 | Scifres et al. | 385/43 |
| 5,384,882 A | 1/1995 | Shimamune et al. | |
| 5,511,141 A | 4/1996 | Peli | |
| 5,600,751 A * | 2/1997 | Peli | 385/116 |
| 6,326,939 B1 * | 12/2001 | Smith | 345/84 |

* cited by examiner

Primary Examiner—John R. Lee
Assistant Examiner—Christopher M. Kalivoda
(74) Attorney, Agent, or Firm—Mark S. Walker; Streets & Steele; Jeffrey L. Streets

(57) ABSTRACT

An apparatus for directing light from a light source through a bundle of optic fibers, wherein the optic fibers are so arranged in the bundle such that at the end of the bundle opposite the light source, the optic fibers may expand into a display of an image generated by the light source. The apparatus comprises a bundle of optic fibers having a base end and a viewing end. The base end has a first angle across the bundle and is arranged so that light from the light source may be directed into the base end of each of the optic fibers. The light entering each of the optic fibers is carried to the viewing end. At the viewing end, each of the optic fibers is cut to expose an interior side face as a pixel viewing area having approximately a 1:1 aspect ratio.

54 Claims, 3 Drawing Sheets

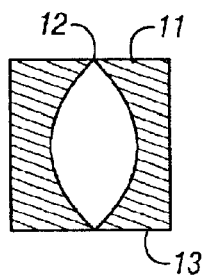 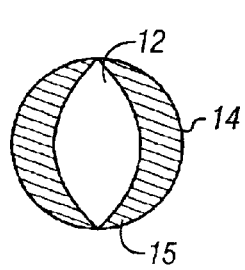 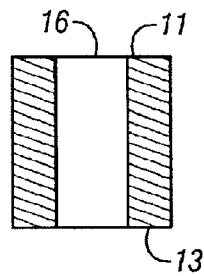 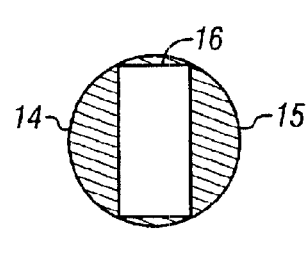
FIG. 1A     FIG. 1B     FIG. 1C     FIG. 1D
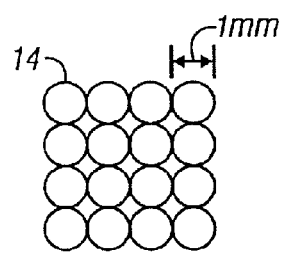 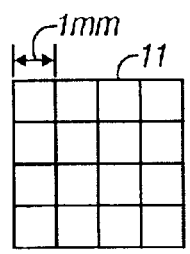 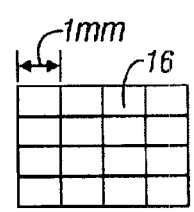
FIG. 2A     FIG. 2B     FIG. 2C
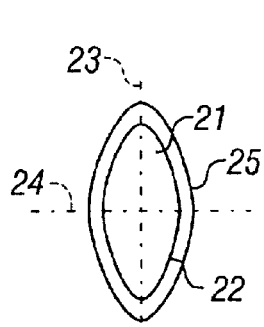 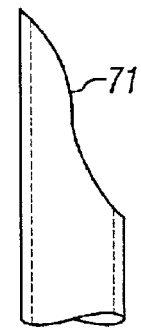 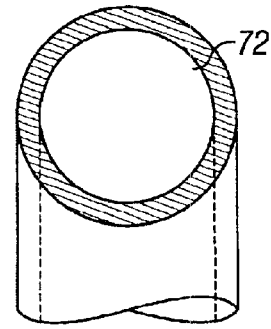
FIG. 3     FIG. 4A     FIG. 4B

REDUCED WEIGHT OBLIQUE VIEW FIBER OPTIC TAPER

BACKGROUND OF THE INVENTION

1. Field of the Invention

The present invention relates to fiber optics, and more particularly, to image transmission over a bundle of optic fibers.

2. Description of the Related Art

There are many uses for transmitting light through an optic fiber and the number of uses increases each year. Inventors working in the field of fiber optics are generating many new and improved uses for optic fibers in both the decorative and technical arts. From the beginning of the technical development of fiber optics, it has been recognized that a bundle of optic fibers presents an excellent method for magnifying or expanding images. By maintaining the fibers at one end of the bundle or cable in a close relationship to receive a small image and then spreading the fibers at the other end to produce a large image, it is possible to magnify pictures of various kinds. The light entering at the small end must be of sufficient intensity in order to obtain an image at the other end that is capable of being seen. Normally, the intensity required to view a magnified image through a fiber optic taper is similar to the intensity required to see an image through a common magnifying glass.

The most common device using fiber optics to magnify an image is the fiber optic taper. A fiber optic taper is a symmetrical bundle of tapered optic fibers wherein the fibers have been well aligned (coherently aligned), and wherein each of the optic fibers is tapered from a wide end to a narrow end. It is important that the relative position of each fiber be maintained from one end of the bundle to the other, so that light entering a fiber at one end of the taper exits the fiber at the other end of the taper in the same relative position. An image may then be transmitted from one face to the opposite face with either a reduction or magnification in size. For example, when the small end of a fiber optic taper is placed in contact with an object such as a printed page, an enlarged image appears at the upper, larger face of the taper. Specifically, the size of the transmitted image is in direct proportion to the change in size of the two ends of the fiber optic taper. Size ratios, i.e., magnifications, of from nearly unity to as much as 10:1 may be practically obtained using a fiber optic taper. Each fiber in the bundle transmits one "pixel" of light from an image at one end of the fiber optic taper to the other end of the taper.

A disadvantage of the fiber optic taper is that it achieves its magnification by the gradual increase in the diameter of each optic fiber in the bundle. Since each fiber in the bundle must increase its diameter proportionally, the overall volume of the fiber in the taper increases exponentially as the magnification factor increases. Thus, optical tapers are short, fat, heavy and provide relatively low magnification. A modest sized optical taper is quite bulky and can have a weight in excess of one pound resulting in high manufacturing costs and limiting the value and application of an optical taper.

As one improvement to the fiber optic taper, Jeskey, in U.S. Pat. No. 4,693,552, describes a fiber optic bundle that may be used for magnification and for transmitting an image that does not use a tapered optic fiber. Instead, Jeskey discloses using a bundle of optic fibers, all having a uniform cross section, with each of the fibers cut at a narrow acute angle at the display end of the bundle, and spreading the fibers apart at the viewing end by separating each of the fibers with a spacer. By cutting the display end off at an acute angle, a display surface is generated having a greater surface area than the cross-sectional area of the optic fiber. The degree of magnification is equal to the ratio of the surface area of the cut display area and the optic fiber's cross-sectional area. Because the display area is increased by cutting the display end at an acute angle, there is no need to taper the optic fiber from a narrow end to a wide display end as is necessary in the conventional fiber optic taper, providing an advantage of less bulk and less weight.

However, there is still a need for smaller, less bulky fiber optic bundles that may be used for transmitting an image for viewing. There is a need for a lightweight alternative to LED displays and other bulky heavy displays that are currently used as displays on portable computers and other devices having display screens. There is a need for small portable display screens that are not large power consumers so that portable devices having display screens may operate for longer periods of time on their limited battery resource.

SUMMARY OF THE INVENTION

The present invention provides an apparatus that may be used to transmit an image from a light source to a viewing end. The apparatus comprises a bundle of optic fibers having a base end with a first angle across the bundle and a viewing end, wherein the viewing end of each optic fiber is cut to expose an interior side face as a viewing area having an aspect ratio of approximately 1:1. Because the aspect ratio of each of the viewing areas is approximately 1:1, it is not necessary to insert spacers between the optic fibers at the viewing end.

While the optic fibers may have any cross sectional shape, preferred shapes are an elliptical or rectangular cross section. Thin optic fibers are preferred with a cross sectional shape having a major axis that is longer than a minor axis. At the viewing end, each of the optic fibers is cut in a shape selected from a notch, an s-curve or a slant cut. Other cuts are possible provided the cut provides a viewing area having an aspect ratio of approximately 1:1. The optic fibers may have a uniform cross section extending from the base end to the viewing end or the optic fibers may have a non-uniform cross section extending from the base end to the viewing end. When the optic fibers have non-uniform cross sections, the cross section may, for example, transition from a round shape or a square shape at the base end to an elliptical shape or a rectangular shape at the viewing end. Preferably, if the cross section of the optic fibers are not uniform, the optic fibers will transition from a shape having approximately a 1:1 aspect ratio at the base end to a different shape at the viewing end.

To provide magnification at the display end, each of the interior side faces has a greater surface area than the cross sectional area of each of the optic fibers.

The optic fibers may be arranged in rows and columns in the bundle. In one embodiment of the invention, the optic fibers may be elliptically shaped and arranged in a lattice within the bundle of optic fibers.

At the base end of the bundle, a light image generator is mounted adjacent to the base end of the bundle. The light image generator may be a cathode ray tube, a plurality of light emitting diodes (LED) or a plurality of lasers. Any light image generator would be acceptable for use with the present invention provided the light from the generator may be directed into the base end of each of the optic fibers.

The relative position of each optic fiber may be maintained from the base end to the viewing end. Alternatively, the relative position of each optic fiber may not be maintained from the base end. The first angle at the base end may be substantially at a right angle to the axis of the optic fiber or alternatively, may be an oblique angle. The viewing end may form either a non-directional field of view or a directional field of view.

Preferably, the optic fibers are bonded together in the bundle with a flexible glue. The flexible glue may be a silicon rubber. Alternatively, the optic fibers may be fused together. If the fibers are bonded with flexible glue, then the bundle will be flexible and able to bend and adjust to a convenient viewing position. If the fibers are fused, the bundle will not be flexible.

The present invention further provides a method of using a bundle of optic fibers comprising receiving light at a base end of each of the optic fibers from a light source and transmitting the light through the optic fibers to a viewing end, wherein each optic fiber is cut at an obtuse angle on the viewing end, and wherein the obtuse angle exposes a face having an aspect ratio of approximately 1:1. The method further comprises forming an image on the viewing end, wherein each optic fiber transmits one pixel of the image to the viewing end, and wherein the light source varies characteristics of the light received at the base end of each of the optic fibers. The image may be formed by varying the characteristics of the light generated by the light source, wherein the characteristics are selected from intensity, color and combinations thereof. The method may be used to provide an image for a television, DVD player, computer, video camera or any other devices that are image generators. Therefore, the characteristics of the light are varied by the image-generating device to form the desired image at the display end of the bundle.

The present invention also provides a method of making a display device comprising, bundling a plurality of optic fibers into a bundle, and cutting a viewing end of the bundle with an obtuse angle across the bundle, wherein the obtuse angle cut exposes a face having an aspect ratio of approximately 1:1. The method further comprises cutting a base end of the bundle with a first angle across the bundle. The optic fibers may be bound with a flexible glue, such as silicone rubber, or the optic fibers may be fused together. Alternatively, the optic fibers may be held together by any means that maintains the viewing end of each optic fiber in position.

The foregoing and other objects, features and advantages of the invention will be apparent from the following more particular description of a preferred embodiment of the invention, as illustrated in the accompanying drawing wherein like reference numbers represent like parts of the invention.

BRIEF DESCRIPTION OF THE DRAWINGS

FIGS. 1A–D show elliptical and rectangular optic fibers superimposed on square and circular optic fibers.

FIGS. 2A–C show cross sections of optic fiber bundles having rectangular, circular, and square optic fibers.

FIG. 3 shows a cross section of an elliptically shaped optic fiber.

FIGS. 4A–B show a side view and a front view of an elliptically shaped optic fiber with an s-curve cut to expose an interior side face.

DETAILED DESCRIPTION

Figure 5A:
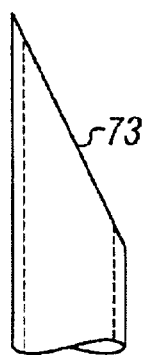
FIGS. 5A–B show a side view and a front view of an elliptically shaped optic fiber with a slant cut to expose an interior side face.

The present invention provides an apparatus for directing light from a light source through a bundle of optic fibers, wherein the optic fibers are so arranged in the bundle such that at the end of the bundle opposite the light source, the optic fibers may expand into a display of an image generated by the light source. The apparatus comprises a plurality of bundled optic fibers having a base end and a viewing end. The base end has a first angle across the bundle and is arranged so that light from the light source may be directed into each of the optic fibers. The light entering each of the optic fibers is carried to the viewing end. At the viewing end, each of the optic fibers is cut to expose an interior side face as a viewing area. Furthermore, each cut results in a viewing area, or pixel, having approximately a 1:1 aspect ratio, thereby eliminating the necessity of inserting spacers between the optic fibers. By eliminating the need for spacers on the display end of the bundle, a sharper brighter display image may be achieved.

Optic fibers are usually long thin strands of very pure glass, though they may also be made of plastic or other materials. The present invention may be implemented with optic fibers of any material, so long as the optic fiber transmits light to display an image at the display end of the optic fiber. An optic fiber usually has a glass core that transmits the light, an outer cladding that reflects the light back into the core, and a buffer coating, usually a plastic coating, that protects the fiber from damage. Optic fibers may be as small as 5 microns or up to more than 1 mm in diameter.

The process for making optic fibers is complex and beyond the scope of the present invention. However, the conventional process involves first producing a very pure glass "preform". The glass preform is then melted and a thin thread is pulled from the melted glass to form the very fine and uniform optic fiber. Optic fibers may be produced with cross sections of varying shapes, including, for example, squares, circles, rectangles and ellipses. The optic fiber may also have varying diameters along its length as well as varying cross sectional shapes, morphing, for example, from a circular optic fiber to an elliptical optic fiber or from a square optic fiber to a rectangular optic fiber.

The present invention transmits light from a light source through a bundle of optic fibers, each optic fiber transmitting the light required to produce one pixel of an image on the viewing end of the bundle. The arrangement of the optic fibers may be of any desired configuration, but preferred arrangements for typical displays may include, for example, 640×480, 800×600, and 1024×768 to fashion a rectangular display face having an aspect ratio of 4:3, a vestige of the 4:3 aspect ratio on a television. The smaller the diameter of the fiber optic used to produce the display, the greater the resolution of the image at the viewing end. However, there is some optimal diameter that provides a high resolution image such that further decrease of the fiber diameter would not result in a sharper image detectable to the human eye. Many fiber optic tapers are produced with optic fibers having a diameter of around 100 microns. However, the optimal diameter and the number of pixels required for a given display would be highly specific to the intended use of the fiber optic display and is not limited by the present invention.

The magnification of the image displayed at the display end of the optic fibers is the ratio the cross sectional area of the optic fiber exposed to the light source to collect the light and the surface area of the exposed interior side face used for display.

While most optic fibers are produced having a circular cross sectional shape, optic fibers may be and are produced in various other shapes, such as elliptical, rectangular and square. In a preferred embodiment of the present invention, the optic fibers have a symmetrical cross section where the major axis is longer than the minor axis, such as an elliptical or rectangular cross sectional shape. Using the elliptical or rectangular cross sectional optic fiber removes some of the material forming, for example, the square or circular optic fiber, that is not contributing to the transmission or display of the image. If a square or circular fiber optic is used in a taper, a considerable portion of fiber material is not contributing to the magnification of the image and is not required for the transmission of the image through the optic fiber. In contrast, by using an elliptically or rectangularly shaped optic fiber, those portions of the fiber that merely transmit redundant color and intensity information have been minimized, thereby reducing the overall size and weight of the bundle. Furthermore, by cutting the display end of each optic fiber to expose an interior side face as a viewing area, maximum use of the elliptical or rectangular cross section may be used to provide a magnified image at a 1:1 aspect ratio.

FIG. 1A–D show optic fibers having an elliptical 12 cross section and optic fibers having a rectangular 16 cross section superimposed on optic fibers having a square 11 cross sectional shape and on optic fibers having a circular 14 cross sectional shape. The shaded areas 13 and 15 show the excess material that lends bulkiness to a bundle of square or circular optic fibers and that may be removed by using elliptically or rectangularly shaped optic fibers in the bundle.

FIGS. 2A–C shows cross sections of bundles of optic fibers packed with rectangular 16 optic fibers having a 1 mm major axis, with circular 14 optic fibers having a 1 mm diameter, and with square 11 optic fibers having a 1 mm edge. As may be seen in FIG. 2C, the rectangularly shaped 16 optic fibers form a smaller bundle because excess material, not efficiently used for transmitting light or for magnification of the image, has been removed in the rectangular cross section of the optic fiber. It should be noted however, that while a rectangular cross section has advantages and is a preferred shape for the optic fiber in accordance with the present invention, the rectangular cross section is not required to practice the present invention and any shaped cross section would be acceptable. Thin fibers may be defined as optic fibers having a major axis that is longer than a minor axis of the thin optic fiber. Preferably, thin fibers of any shape may be bundled in accordance with the present invention so long as the pixel viewing ends of the optic fibers may be cut to provide an approximately 1:1 aspect ratio.

To prevent distortion of the image at the display end, it is important to provide a pixel viewing area having a 1:1 aspect ratio. If the ratio is other than 1:1, distortion of the image will occur. Furthermore, in computer graphics programming, a 1:1 aspect ratio, or "square pixels", is preferred in graphics algorithms. Optic fibers having a circular or square cross sectional area have a 1:1 cross sectional area. To make a 1:1 aspect ratio on the viewing area of an optic fiber having an elliptical cross-section, the end may be cut to expose an interior side face for display having a 1:1 aspect ratio. These cuts may be, for example, in the shape of an s-curve, a notch, or a slant cut on an elliptically shaped optic fiber. FIG. 3 shows a cross section of an elliptically shaped optic fiber and FIGS. 4A–B through FIGS. 6A–B show the elliptical optic fiber cut with an s-curve, a notch and a slant cut.

An elliptically shaped optic fiber having the cross section shown in FIG. 3 is described by its major axis 23 and its minor axis 24. The core 21 of the optic fiber is usually made of very pure glass or plastic and is used to transmit the light from a first end of the optic fiber to the display end of the optic fiber. Coating the optic fiber is the cladding 22 and buffer coating 25. The cladding 22 reflects the light back into the core and the buffer coating 25 protects the optic fiber.

FIG. 4A shows a side view of an elliptically shaped optic fiber with an s-curve cut 71 to expose an interior side face 72 in accordance with the present invention. FIG. 4B is a front view of the exposed interior side face 72. As may be seen from FIG. 4B, cutting the elliptically shaped optic fiber with an s-curve results in an approximate circular exposed interior side face 72 having an aspect ratio of approximately 1:1.

Figure 5B:
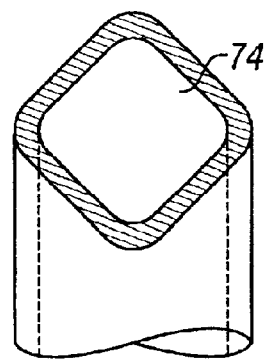

FIG. 5A shows a side view of an elliptically shaped optic fiber with a slant cut 73 to expose an interior side face 74 in accordance with the present invention. The slant cut 73 is made by cutting the optic fiber at an acute angle to the major axis 23 of the ellipse. FIG. 5B shows a front view of the exposed interior side face 74. As may be seen from FIG. 5B, cutting the elliptically shaped fiber optic with a slant cut 73 results in an approximate square exposed interior side face 74 having an aspect ratio of approximately 1:1.

Figure 6A:
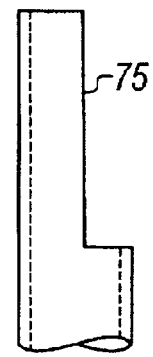
FIGS. 6A–B show a side view and a front view of an elliptically shaped optic fiber with a notch cut to expose an interior side face.
Figure 6B:
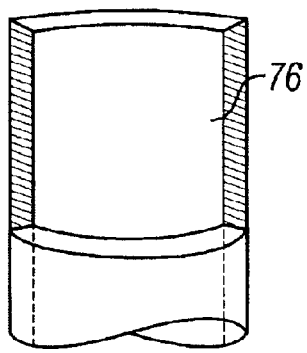

FIG. 6A shows a side view of an elliptical optic fiber with a notch cut 75 to expose an interior side face 76 in accordance with the present invention. FIG. 6B shows a front view of the exposed interior side face 76. As may be seen from FIG. 6B, cutting the elliptically shaped optic fiber with the notch cut 75 results in an approximate square exposed interior side face 76 having an aspect ratio of approximately 1:1.

Figure 7A:
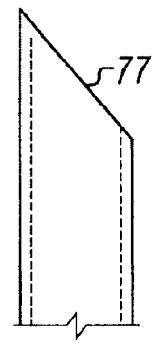
FIGS. 7A–B show a side view and a front view of a rectangularly shaped optic ficer with a slant cut to expose an interior side face.
Figure 7B:
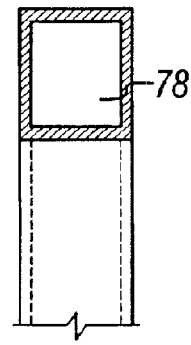

FIG. 7A shows a side view of a rectangular optic fiber with a slant cut 77 to expose an inner side face 78 in accordance with the present invention. FIG. 7B shows a front view of the exposed interior side face 78. As may be seen from FIG. 7B, cutting the rectangularly shaped optic fiber with the slant cut 77 results in an approximate square exposed interior side face 78 having an aspect ratio of approximately 1:1.

While a thin optical fiber is a preferred shape for the cross section of an optic fiber used in accordance with the present invention, any shaped cross section may be used that provides a 1:1 aspect ratio when cut to expose an interior side face.

Unlike the common fiber optic taper used to magnify an image, the bundle of optic fibers of the present invention does not have to transmit an image displayed at the first end to the second display end of the bundle. The arrangement of the light source may be in any convenient arrangement as long as the light entering each optic fiber is the light source for a given pixel of the display at the display end of the present invention. Of course, the present invention may be used as a conventional fiber optic taper and merely transmit a formed image from one end of the bundle to the other end of the bundle.

Figure 8A:
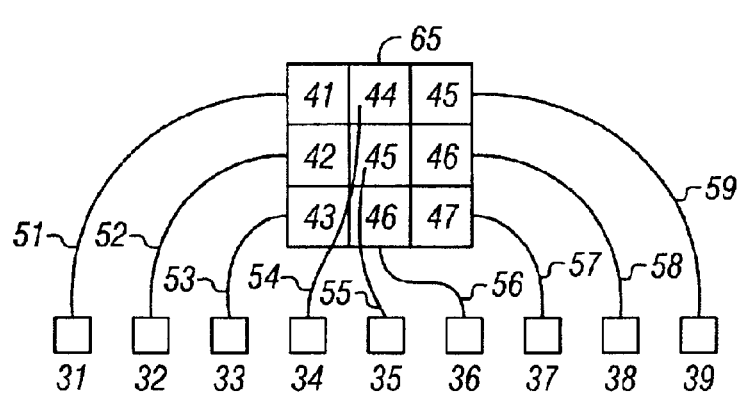
FIGS. 8A–B illustrates an arrangement of light sources that do not form an image at the source end in accordance with the present invention.
Figure 8B:
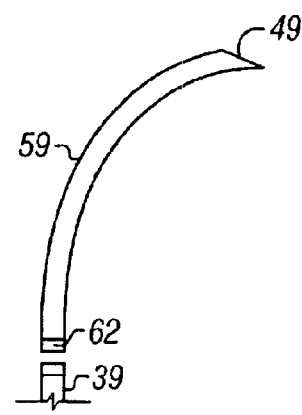

FIG. 8A–B illustrate an arrangement of light sources that do not form an image at the source end, but do form an image at the display end of a bundle of optic fibers. If the light sources that are directed into each of the optic fibers are from, for example, small lasers or from LEDs, then the arrangement of the light sources may be in any configuration, such as the row shown in FIG. 8A. Light sources 31–39 direct light into the source end of each optic fiber 51–59. The source end of each optic fiber is located above an assigned light source, which when activated, sends light into a single assigned optic fiber to create one pixel of the displayed image at the other end of the bundle. In this manner, for example, if light sources 32, 35, and 38 were activated, an image of a horizontal bar would appear across the display screen 65 because light would travel through optic fibers 52, 55, and 58 to their respective display ends 42, 45, and 48, thereby creating a horizontal bar on the display screen 65. The display screen 65 is made up of the display ends 41–49 of each of the optic fibers 51–59 arranged to form a 3×3 display screen 65 with the display end of each optic fiber cut to expose an interior side face in accordance with the present invention.

In this example, there is no image of a horizontal bar that may be viewed by looking only at the light sources, but when each optic fiber 51–59 is arranged by pixel at the display screen 65, the image of the bar is displayed. An example of one optic fiber 59 is shown in the detail of FIG. 8B. The light-receiving end 62 of the optic fiber 59 is arranged over the light source 39, such that the light from the light source 39 is directed into the light-receiving end 62. The display end 49 of the optic fiber is cut at a slant cut to expose an interior side face as the display 49 for the pixel of an image formed on the display screen 65.

In this manner, each of the individual light sources may be arranged in any formation so long as each of the optic fibers carrying a pixel of the image to the display screen is arranged to position the display end of the optic fiber at the location for the pixel assigned to that particular optic fiber/light source combination. Of course, the light source may itself display an image if the light source is, for example, a cathode ray tube displaying an image, in which case each optic fiber must be arranged at the same relative location on both the light source end and the display end. The light source may be a cathode ray tube, a plurality of light emitting diodes (LED), a plurality of lasers, or a plurality of any other light emitting elements.

There is a great deal of research and development occurring in the field of light emitting elements, especially in the field of micro-miniature light sources that are created by printing the active elements on silicon wafers producing extremely small, pixel based light sources. The silicon laser is another example of small light emitting sources that are being developed. While a detailed description of these devices is beyond the scope of the present invention, these devices or similar devices that produce a light source that may be directed to an optic fiber may be used in accordance with the present invention.

Figure 9A:
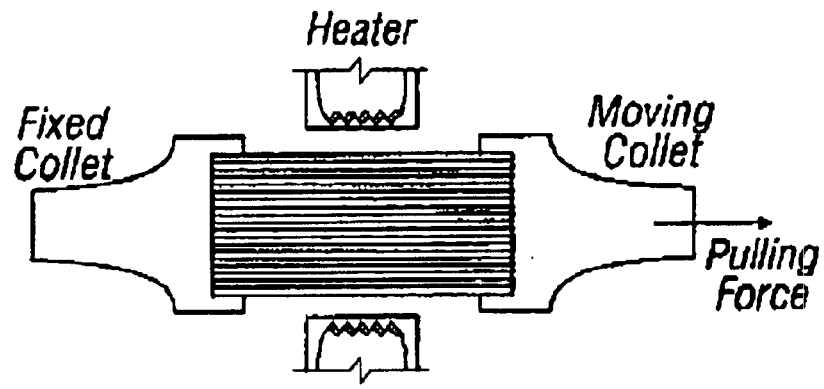
FIGS. 9A–C illustrate heating and bending a bundle of optic fibers.
Figure 9B:
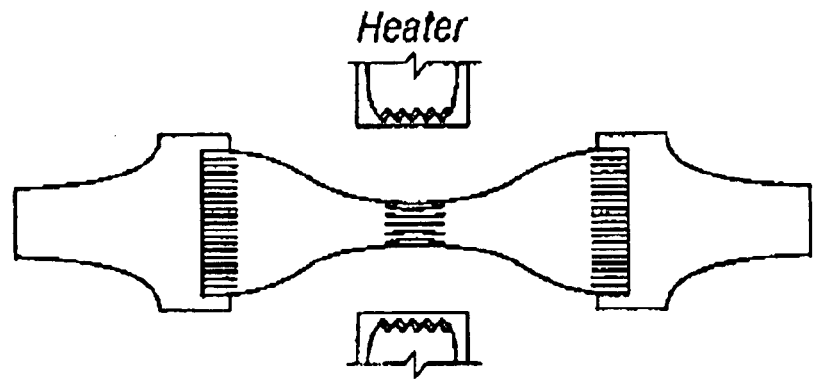
Figure 9C:
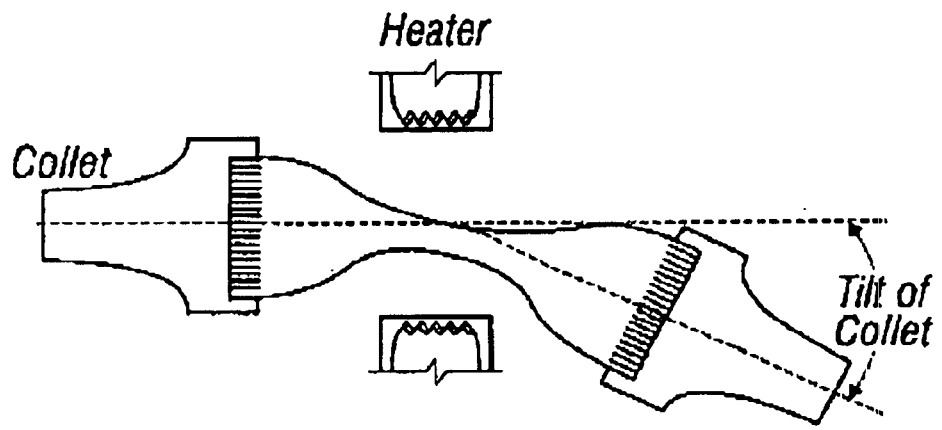

To further reduce the bulk of the display device of the present invention, tapering the middle of the bundle of optic fibers can reduce the weight and bulk of the display apparatus. Tapering the bundle may be accomplished by softening the fiber bundle at an appropriate temperature in an electric furnace as shown in FIG. 9A. The usual tapering process is done by heating the central region of a bundle of optic fibers and pulling the softened bundle into an hourglass shape as shown in FIG. 9B. If the bundle is made up of fused optic fibers and therefore will be inflexible when cooled, bending the bundle may be achieved, if desired, while the central section is hot by tilting one end relative to the other as shown in FIG. 9C, either as part of the same heating cycle or as a separate operation.

In a preferred embodiment, the optic fibers in the bundle may be bonded with flexible glue, such as silicon rubber, so that the bundle remains flexible even when cooled after being tapered in the middle using heat. By using the flexible glue to bond the optic fibers in the bundle, the fibers may move slightly in relation to each other, thereby making the bundle flexible. In this embodiment, a flexible fiber optic cable morphing into a 300×400 pixel display, for example, could be plugged into a television, DVD player, video camera or other image generating device as a passive (non-electrically powered) display appliance. Alternatively, if the optic fibers were fused rather than bonded together by flexible glue, then the resulting passive display appliance would be inflexible.

Because the light sources may be arranged in an order different from the displayed image, the aspect ratio of the inlet end of the bundle does not have to be 1:1. Instead, it is only important to make sure that the light from the individual light sources for each of the optic fibers enters the correct optic fiber that displays a particular pixel of an image on the display end. However, if the displayed image at the display end of the optic fiber bundle is of a smaller image displayed by the light source at the inlet end, for example, an image displayed on a cathode ray tube, then the aspect ratio of the inlet ends must also be 1:1. This may be accomplished by using a fiber optic having a cross sectional shape that has a 1:1 aspect ratio on the inlet end and a thin cross sectional shape for the remaining portions of the optic fibers.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. An apparatus comprising:
   a bundle of optic fibers having a base end with a first angle across the bundle and a viewing end, wherein the viewing end of each optic fiber is cut to expose an interior side face as a viewing area having an aspect ratio of approximately 1:1.

2. The apparatus of claim 1, wherein there are no spacers between the optic fibers at the viewing end.

3. The apparatus of claim 1, wherein each of the optic fibers has a cross sectional shape selected from elliptical and rectangular.

4. The apparatus of claim 1, wherein each of the optic fibers has a cross sectional shape, having a major axis that is longer than a minor axis.

5. The apparatus of claim 1, wherein the cut is in a shape selected from a notch, an s-curve, and a slant cut.

6. The apparatus of claim 1, wherein each of the optic fibers has a uniform cross-section extending from the base end to the viewing end.

7. The apparatus of claim 1, wherein each of the optic fibers has a non-uniform cross-section extending from the base end to the viewing end.

8. The apparatus claim 7, wherein the non-uniform cross-section of each optic fiber transitions from a round shape at the base end to an elliptical shape at the viewing end.

9. The apparatus of claim 7, wherein the non-uniform cross-section of each optic fiber transitions from a square shape at the base end to an elliptical shape at the viewing end.

10. The apparatus of claim 7, wherein the non-uniform cross-section of each optic fiber transitions from a shape having a 1:1 aspect ratio at the base end to a different shape at the viewing end.

11. The apparatus of claim 7, wherein the non-uniform cross-section of each optic fiber transitions from a square shape at the base end to a rectangular shape at the viewing end.

12. The apparatus of claim 1, wherein each of the exposed interior side faces has a greater surface area than the cross sectional area of each of the optic fibers.

13. The apparatus of claim 1, wherein the optic fibers are arranged in rows and columns.

14. The apparatus of claim 1, wherein the optic fibers are elliptically shaped, and wherein the optic fibers are arranged in a lattice.

15. The apparatus of claim 1, further comprising:
a light image generator mounted adjacent the base end of the bundle.

16. The apparatus of claim 15, wherein the light image generator is a cathode ray tube.

17. The apparatus of claim 15, wherein the light image generator is a plurality of light emitting diodes.

18. The apparatus of claim 15, wherein the light image generator is a plurality of lasers.

19. The apparatus of claim 15, wherein the light image generator is a plurality of light emitting elements.

20. The apparatus of claim 1, wherein the viewing end forms a non-directional field of view.

21. The apparatus of claim 1, wherein the viewing end forms a directional field of view.

22. The apparatus of claim 1, wherein the relative position of each optic fiber is maintained from the base end.

23. The apparatus of claim 1, wherein the relative position of each optic fiber is not maintained from the base end.

24. The apparatus of claim 1, wherein the first angle is substantially at a right angle to the axis of the optic fiber.

25. The apparatus of claim 1, wherein the first angle is an oblique angle.

26. The apparatus of claim 1, wherein a plurality of optic fibers are fused together in the bundle.

27. The apparatus of claim 1, wherein a plurality of optic fibers are bonded with a flexible glue in the bundle.

28. The apparatus of claim 27, wherein the flexible glue is a silicon rubber.

29. An apparatus comprising:
a bundle of optic fibers having a base end with a first angle cut across the bundle and a viewing end, wherein the viewing end of each optic fiber is cut at an obtuse angle to expose a face having an aspect ratio of approximately 1:1.

30. A method of using a bundle of optic fibers, comprising:
receiving light at a base end of each of the optic fibers from a light source;
transmitting the light through the optic fibers to a viewing end, wherein each optic fiber is cut at an obtuse angle on the viewing end, and wherein the obtuse angle exposes a face having an aspect ratio of approximately 1:1.

31. The method of claim 30, further comprising:
forming an image on the viewing end, wherein each optic fiber transmits one pixel of the image to the viewing end, and wherein the light source varies characteristics of the light received at the base end of each of the optic fibers.

32. The method of claim 31, wherein the characteristics are selected from intensity, color, and combinations thereof.

33. The method of claim 31, wherein the characteristics are varied by a device selected from a television, a computer, a DVD player, and a video camera.

34. The method of claim 31, wherein the characteristics are varied by an image-generating device.

35. The method of claim 30, wherein each of the optic fibers has a cross sectional shape having a major axis that is longer than the minor axis.

36. The method of claim 30, wherein each of the optic fibers has a across sectional shape selected from elliptical and rectangular.

37. The method of claim 30, wherein the face has a greater surface area than the cross sectional area of each of the optic fibers.

38. The method of claim 30, wherein the light source is selected from a cathode ray tube, a plurality of light emitting diodes, a plurality of lasers and combinations thereof.

39. The method of claim 30, wherein the light source is a plurality of light emitting elements.

40. A method of making a display device, comprising:
bundling a plurality of optic fibers into a bundle;
cutting a base end of the bundle with a first angle across the bundle;
cutting a viewing end of the bundle with an obtuse angle across the bundle, wherein the obtuse angle cut exposes a face having an aspect ratio of approximately 1:1.

41. The method of claim 40, wherein the plurality of optic fibers are bundled in rows and columns.

42. The method of claim 40, wherein the plurality of optic fibers are bundled in a lattice formation.

43. The method of claim 40, wherein the plurality of optic fibers are bundles in a random order.

44. The method of claim 40, further comprising:
binding the optic fibers with a flexible glue.

45. The method of claim 44, wherein the flexible glue is silicone rubber.

46. The method of claim 40, further comprising:
fusing the optic fibers together.

47. The method of claim 40, wherein each optic fiber transmits one pixel of an image to the viewing end of the bundle.

48. The method of claim 40, wherein each of the optic fibers has a cross sectional shape having a major axis that is longer than the minor axis.

49. The method of claim 40, wherein each of the optic fibers has a cross sectional shape selected from elliptical and rectangular.

50. The method of claim 40, wherein the (ace has a greater surface area than the cross-sectional area of each of the optic fibers.

51. The method of claim 40, wherein the obtuse angle cut is a shape selected from slant, notch and s-curve.

52. The method of claim 40, wherein the first angle cut exposes a receiving area having an aspect ration of approximately 1:1.

53. The method of claim 40, wherein the first angle cut exposes a light receiving area not having an aspect ratio of approximately 1:1.

54. The method of claim 40, farther comprising:
heating a middle section of the bundle, wherein the optic fibers are softened;
pulling the viewing end away from the base end, wherein the middle section is lengthened and narrowed.

* * * * *

UNITED STATES PATENT AND TRADEMARK OFFICE
CERTIFICATE OF CORRECTION

PATENT NO. : 6,801,697 B2
DATED : October 5, 2004
INVENTOR(S) : Paul Anthony Thayer It is certified that error appears in the above-identified patent and that said Letters Patent is hereby corrected as shown below:

Column 10,
Line 11, replace "across" with -- cross --.
Line 47, replace "(ace" with -- face --.

Signed and Sealed this

Fifth Day of April, 2005

JON W. DUDAS
*Director of the United States Patent and Trademark Office*